United States Patent
Dietrich

[11] 3,712,751
[45] Jan. 23, 1973

[54] MULTIPLE PURPOSE POWER TOOL FOR PORTABLE AND BENCH USE

[76] Inventor: William John Dietrich, 1327 Santa Fe Avenue, Modesto, Calif. 95350

[22] Filed: May 20, 1971

[21] Appl. No.: 145,288

[52] U.S. Cl. .................... 408/20, 144/35, 173/48, 173/51, 74/22 A
[51] Int. Cl. ............................................. B27c 9/00
[58] Field of Search ....... 408/20, 22; 144/35; 173/47, 173/48, 50, 51; 74/22 A

[56] References Cited

UNITED STATES PATENTS 2,858,703  11/1958  Willcox ............................ 144/35 A Primary Examiner—Francis S. Husar
Attorney—Frank E. Wattles

[57] ABSTRACT

A power driven tool which provides rotary motion for drills and the like through a rotating shaft having a segment formed as worm threads. A worm gear provides a central aperture surrounded by teeth holes. A square spline formed at one end of a shaft extends through the aperture in the worm gear. A two-position clutch has teeth formed thereon adjacent the opposing teeth holes of the worm gear and has a squared bore to receive the splined end of the spline shaft. The clutch is disengaged when the clutch teeth are not inserted into the gear holes and is engaged to rotate with the gear when the teeth are in the holes and the splined shaft in the squared bore. The splined shaft will rotate with the clutch and gear when the clutch is engaged. The spline shaft has an eccentric cam formed at the other end. A cam follower is connected to a hollow tool holder which reciprocates upon rotation of the eccentric cam. The tool holder receives saws, files and the like and provides reciprocating motion thereto. The frame of the rotary portion is independent of the frame of the reciprocator portion. Thus, the rotator can be set in any position over 360° about the axis of the spline shaft and relative to the reciprocator. A stand, rack and pinion attachment, and slotted table provide the remaining parts to form many different tools. With the clutch disengaged and the reciprocator attached to the stand and rack and pinion, the table can be adjusted in position relative to a circular saw or grinding wheel to form a horizontal mill and grinding table, respectively. With the rotator connected to the stand and the clutch engaged, a blade saw attached to the reciprocator forms a vertical saw. By other combinations there is formed a drill press, circular table saw with straight or angle cut, power file, horizontal saw and file, and the like.

8 Claims, 14 Drawing Figures

PATENTED JAN 23 1973

William J. Dietrich
INVENTOR.

BY Frank Watts

ATTORNEY

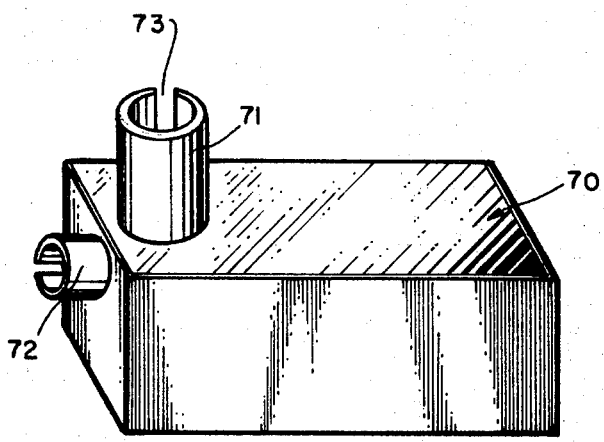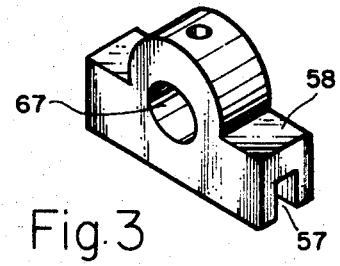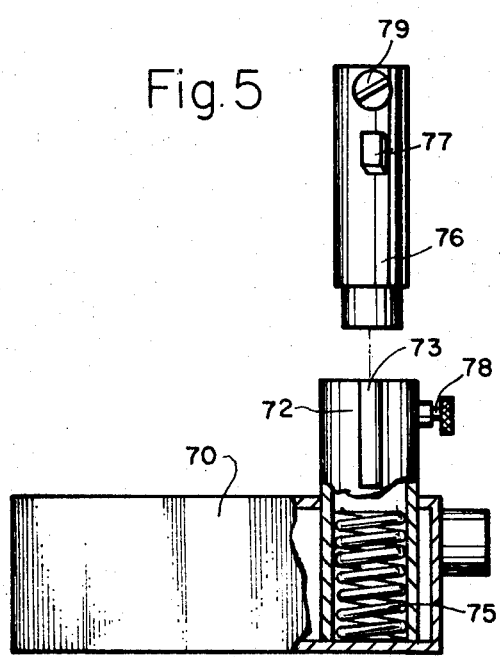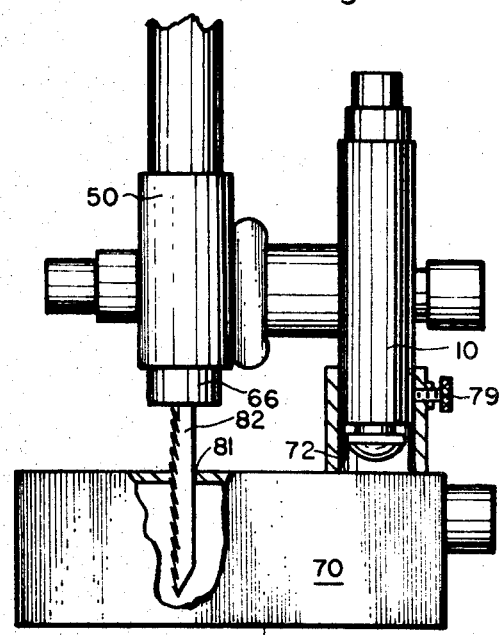
William J. Dietrich
INVENTOR.
BY Frank Wattles
ATTORNEY William J. Dietrich
INVENTOR.

BY Frank Wattle
ATTORNEY

William J. Dietrich
INVENTOR.

BY Frank Wattles

ATTORNEY

MULTIPLE PURPOSE POWER TOOL FOR PORTABLE AND BENCH USE

BACKGROUND OF THE INVENTION

1. Field of the Invention

A power driven device providing rotation or reciprocating motion to a tool attachment for multiple purpose portable or bench use.

2. Description of the Prior Art

Power driven hand devices providing a rotary motion output to one implement and alternately or simultaneously providing reciprocating motion to another implement are known. A shaft common to both kinds of output is driven by a motor, one output being driven by the rotating shaft through a worm gear and the other output linked to the worm gear through an eccentric member for providing reciprocating motion. Such devices are compact and usually suitable for multi-purpose operations.

Other power driven hand devices provide both rotary motion and reciprocating motion at a single output. A common drive shaft is rotated by a motor for rotary motion to the output. The common shaft is disengaged and a spline shaft internally connected thereto rotates an eccentric roller which is connected to the output. The motion of the roller causes reciprocating motion at the output and sliding of the connecting shaft along the splined shaft with the to and fro movement.

Three patents illustrating the conventional art are:
- 2,531,849  Power Operated Hand Tool
- 2,775,898  Power-Driven Hand Device To Be Used As A Tool For Multiple Purposes
- 2,858,703  Power Driven Hand Unit For Rotary And Reciprocating Tools The conventional devices are designed to conveniently and efficiently in a compact light weight device perform a wide variety of material working operations. The present invention is an improvement of those conventional devices significantly increasing the variety of operations in a convenient and efficient manner. A spline shaft is mated with a two-position clutch through a worm gear. When the clutch is disengaged a drive shaft provides rotary motion at one output. With the clutch engaged, clutch teeth mesh by extending into complementary holes formed in the worm gear, the spline shaft extending through the clutch is rotated so that its eccentrically shaped other end drives a reciprocator output. The frame supporting the rotary output portion is independent of the frame of the reciprocator output portion. Thereby, the two portions can be completely separated or can be adjusted to any angle between the axis of rotation of the rotator and the axis of the reciprocator. The frame of each portion is shaped to receive external attachments such as a stand, table, rack and pinion elevator and mounting brackets. The attachments combined with the variable positioned rotator-reciprocator assembly produce a portable or bench tool which can be used as an electric drill, drill press, stationary or portable grinder, stationary or portable filer, band saw, skill saw, horizontal, and angle mill, and numerous other operations which will be apparent to a skilled machine operator.

SUMMARY OF THE INVENTION

Briefly, this invention is a universal portable tool comprising a rotary portion and a reciprocator portion. The rotary portion comprises a frame with a rotatable shaft within the frame. The shaft has worm threads thereon adapted to mesh with a worm gear. A worm gear is meshed with the worm threads and has an axis of rotation substantially perpendicular to the axis of rotation of the rotatable shaft. A hole extends through the gear along the axis of rotation. Means are formed on one side of the gear around the hole to engage a clutch. A chuck is attached to one end of the second shaft to rotate therewith. A two-position clutch is located adjacent to the one side of the worm gear. The clutch has means formed at one end of the clutch to engage the worm gear so the clutch rotates with the worm gear when the clutch means and worm gear means are engaged. Means are provided for rotating the first shaft. Further, means are provided for supporting the first and second shafts within the frame.

The reciprocator portion comprises a frame with a rotatable shaft within the reciprocator frame. One end of the reciprocator shaft is engageable with the clutch to rotate therewith. The other end of the reciprocator shaft has an eccentric cam formed thereon. A tool holder is adapted to reciprocate with the reciprocator frame and a cam follower operatively connects the eccentric cam to the tool holder for reciprocation of the holder upon rotation of the reciprocator shaft.

BRIEF DESCRIPTION OF THE DRAWINGS

In the drawings:

FIG. 3 is an enlarged perspective view of the slotted slide bar.

FIG. 4 is a perspective view of the stand.

FIG. 5 is a cutaway elevation view of the stand and adapter sleeve.

FIG. 6 is a schematic representation of a vertical saw.

DESCRIPTION OF THE PREFERRED EMBODIMENT

Figure 1:
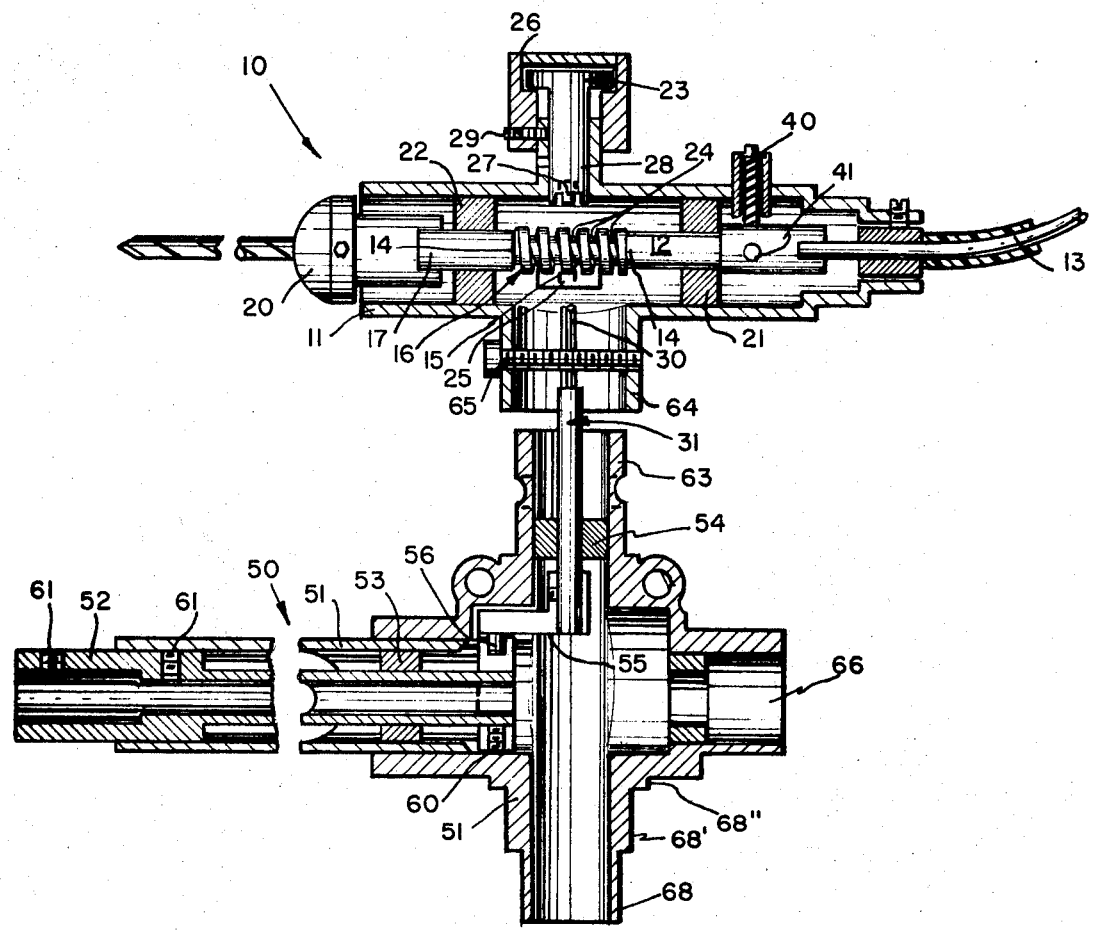
FIG. 1 is a sectioned view of the rotator and reciprocator.
Figure 2:
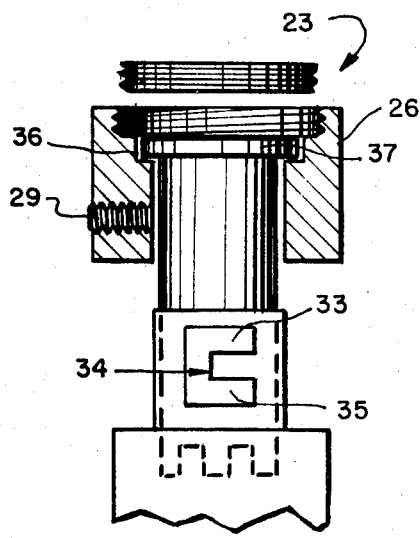
FIG. 2 is an enlarged view of the clutch.

Referring now to the drawings, and first to FIG. 1 thereof, the rotary portion 10 comprises a frame 11 within which is located a rotatable shaft 12. A flex shaft 13 provides the means for rotating shaft 12. Worm threads 14 are formed on shaft 12 to mesh with like worm threads 15 of worm gear 16. Shaft 12 is attached at its free end 17 to chuck 20. Bearings 21, 22 provide means of support for shaft 12, and gear 16 within frame 11. A two-position clutch 23 is located adjacent to one side of gear 16. Clutch 23 is carried within the frame 11 and cap 26. A screw 29 provides means to secure cap 26 to frame 11. Clutch 23 has formed thereon teeth 27 which can insert within teeth holes 24 and a splined cavity 28 for receiving a similarly splined end 30 of shaft 31. In one position the clutch is disengaged with teeth holes 24 and teeth 27 out of meshing contact and end 30 within cavity 28. In the other position the clutch is engaged with teeth holes 24 and teeth 27 meshing and end 30 remaining inserted within cavity 28. The axes of rotation of gear 16, clutch 23 and shaft 31 are coincident. Clutch 23 is maintained in a disengaged position by extension of screw 29 into slot portion 33 of slot 34 as best shown in FIG. 2. Cap 26 has shoulders 36 which receive flanged portions 37 of clutch 23 for support. The cap 26 is turned and screw 29 transferred along slot 34 to portion 35 to place clutch 23 in an engaged position. A spring biased pin 40 is located on frame 11 adjacent to a hole 41 within shaft 12. Pin 40 is inserted into hole 41 by pressing down against the pin.

The reciprocator portion 50 comprises a frame 51 within which is located the rotatable shaft 31. A tool holder 52 is located within frame 51 and having an axis at substantially a right angle to the axis of rotation of shaft 31. Holder 52 nests within frame 51 to reciprocate along the internal wall thereof. Bearings 53, 54 support the holder 52 and shaft 31 respectively within frame 51. An eccentric cam 55 is formed at one end of shaft 31. A pin 56 operates as a cam follower and is located within the slot 57 of slide bar 58 as best illustrated in FIG. 3. Bar 58 is fastened to holder 52 by screw 60. Holder 52 is shaped to receive a tool handle or extension which is secured within the holder by screws 61. Frame 51 is tubular in shape at area 63 and is slightly smaller than frame 11 at area 64 in order to slip within the larger frame. Screw 65 extends through holes in the overlapping frames 63, 64 to provide means for locking the rotator 10 relative to the reciprocator 50. Frame 51 forms a channel 66 into which tools may be inserted to be received into an aperture 67 in bar 58 and to be reciprocated thereby. Mounting surfaces 68, 68', 68'' are formed at the external surface of frame 51 to provide means for mating the rotator-reciprocator assembly to accessory equipment.

In operation, shaft 12 is rotated by flex shaft 13 which is operatably connected to a motor not shown. Shaft 12 and worm threads 14 drive gear 16 to rotate about an axis substantially at right angle to the axis of shaft 12. Chuck 20 is rotated by shaft 12 to which it is connected. With clutch 23 disengaged shaft 31 is not rotated. Engagement of clutch 23 by positioning screw 29 in slot 35 meshes teeth holes 24 and teeth 27. Clutch 23 and shaft 31 rotate with gear 16. Rotation of cam 55 causes pin 56 to reciprocate bar 58 and the connected holder 52. Pin 56 slides back and forth within slot 57. A tool inserted in holder 52 such as the saw illustrated in FIG. 1 is reciprocated. In order to temporarily stop rotation and reciprocation, for instance to change tools, pin 40 may be depressed into hole 41, thereby halting rotation of drive shaft 12. Release of pin 40 will remove the pin from the hole through the spring action and the assembly will be rotated and/or reciprocated again.

Figure 7:
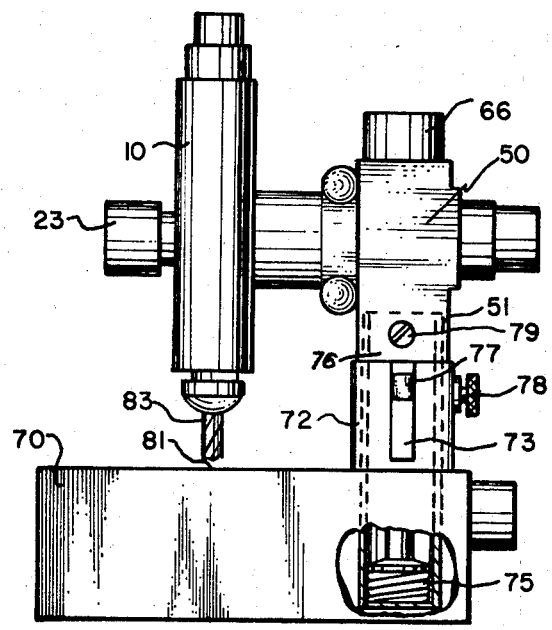
FIG. 7 is a schematic representation of a drill press.

To provide a bench environment for the rotator-reciprocator assembly accessories are provided such as in FIG. 5 showing a stand 70. Means connecting the stand 70 with the rotator-reciprocator assembly for supporting the assembly is provided by sleeve 71 or sleeve 72. Each sleeve has a guide slot 73 to receive a key therein. The sleeves do not require the guide slot unless the stand includes a spring 75 as illustrated in FIG. 5. An adapter sleeve 76 with a key 77 is inserted into sleeve 72 so the key slides in slot 73 while sleeve 76 rides upon spring 75. Screw 78 secures sleeve 76 within sleeve 72 when movement is not desired. Screw 79 of sleeve 76 is for securing a member placed therein. The attachment of the rotator 10 to sleeve 72 without sleeve 76 is illustrated in FIG. 6. The stand is provided with aperture 81 to accommodate a reciprocating saw blade 82. In this configuration the tool is a vertical saw (or file) and table. By contrast, FIG. 7 shows stand 70 with spring 75 and sleeve 76 mounted thereon and within sleeve 72. In this configuration of a drill press, reciprocator frame 51 is inserted within sleeve 76 and screw 79 secures sleeve 76 to frame 51. Screw 78 is not tightened, thereby leaving sleeve 76 free to ride on spring 75 and key 77 to slide within slot 73. Clutch 23 is disengaged so the reciprocator 50 will not operate. The drill 83 is rotated and pressed downward toward the piece to be drilled. When the downward pressure is released the compressed spring 75 forces sleeve 76 and the rotator-reciprocator assembly upward to a normal position.

Figure 8:
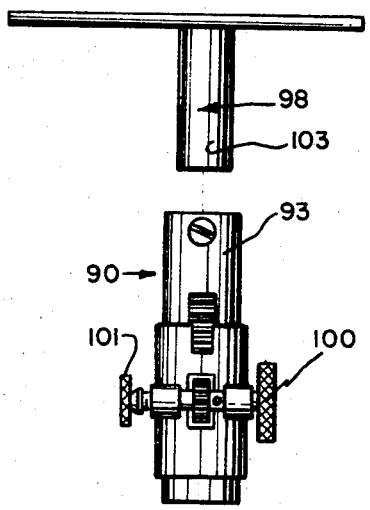
FIG. 8 is an end view of the rack and pinion with table.
Figure 9:
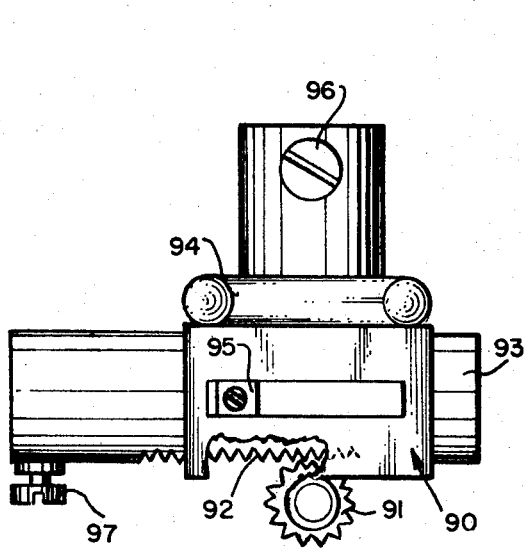
FIG. 9 is an elevation view of the rack and pinion.
Figure 10:
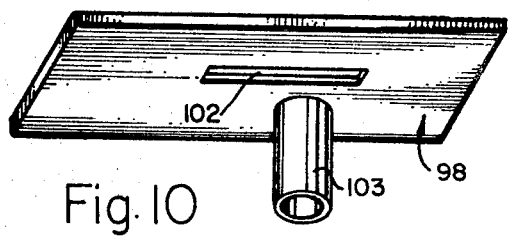
FIG. 10 is a perspective view of a table.
Figure 11:
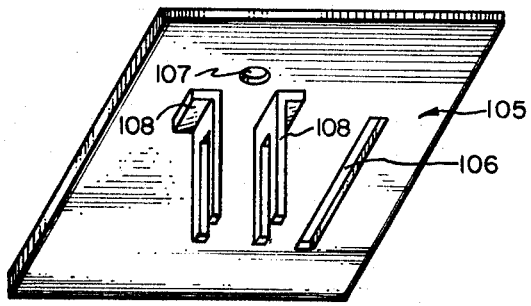
FIG. 11 is a perspective view of a large table.

A rack and pinion accessory 90 is illustrated in FIGS. 8, 9. The pinion gear 91 advances upon rack 92 to move tube 93 relative to the member on which the pinion case 94 is mounted. Key 95 prevents tube 93 from turning in case 94. Screw 96 mounts accessory 90 to another member. Screw 97 secures a member inserted within tube 93. In FIG. 8 a table 98 is shown in a projected position from insertion in tube 93. Wheel 100 turns the pinion gear 91 for tube travel and nut 101 when tightened locks pinion gear 91 preventing tube travel. FIG. 10 shows table 98 with circular saw blade slot 102 and mounting post 103. Another table design is shown in FIG. 11 in which table 105 has a similar circular saw blade slot 106, a hole 107 for reciprocating files or saw blades, and two mounting brackets 108.

Figure 12:
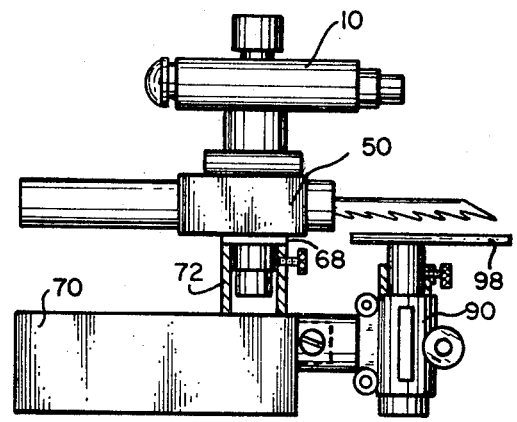
FIG. 12 is a schematic representation of a horizontal file.
Figure 14:
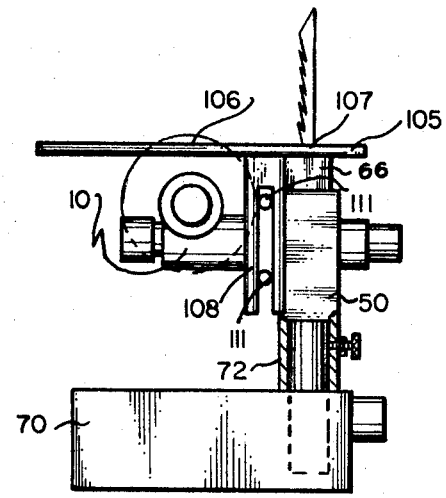
FIG. 14 shows the large table mounted.
Figure 13:
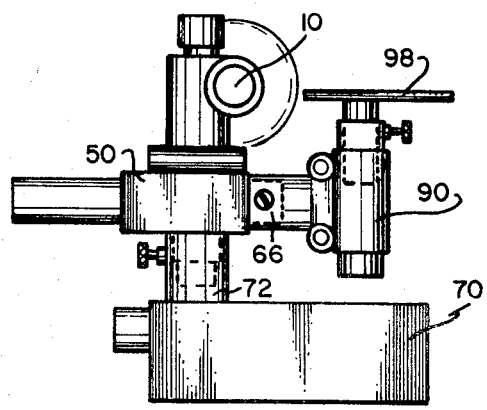
FIG. 13 is a schematic representation of a grinding table.

A horizontal saw and file configuration is illustrated in FIG. 12 employing stand 70 having sleeve 72 in which is inserted reciprocator 50 at mounting surfaces 68, 68' or 68''. Rack and pinion accessory 90 is attached to stand 70 and adjustably supports table 98 below a saw or file in reciprocator 50. Simply moving the accessory 90 to be attached at the area 66 of reciprocator 50 and rotating the relative position of rotator 10 and reciprocator 50 converts the configuration to a grinding table when a grinder is attached to chuck 20, as shown in FIG. 13. Table 105 is illustrated as mounted over rotator 10 and reciprocator 50 to provide a power file and circular table saw. Frame 51 is inserted into sleeve 72 of stand 70 and area 66 receives the file or saw for reciprocation, the file or saw extending through hole 107. Rotator 10 has a circular saw blade 110 mounted at the chuck 20 and extending through slot 106. Mounting brackets 108 are adjustably secured to frame 51 at nuts 111. By adjusting the position of the nuts within the slots of brackets 108, the height of table 105 and the depth of saw cut can be adjusted.

Clearly the number of useful configurations utilizing the rotator-reciprocator assembly and any of the accessories is too great to describe herein and, thus, a few configurations have been illustrated and described. Other configurations will be apparent to skilled machinists and are included within the scope of the invention.

I claim:
1. A universal portable tool comprising:
a rotary portion comprising:
  a. a frame,
  b. a rotatable shaft within the frame with worm threads thereon adapted to mesh with a worm gear,
  c. a worm gear meshed with the worm threads, said worm gear having an axis of rotation substantially perpendicular to the axis of rotation of the rotatable shaft and a hole therethrough at the axis of rotation of the gear with means formed on one side of the gear around the hole to engage a clutch,
  d. a chuck attached to one end of the shaft to rotate therewith,
  e. a two-position clutch located adjacent to said one side of the worm gear, said clutch having means formed at one end adapted to engage the worm gear so that the clutch rotates with the worm gear when the clutch means and worm gear are engaged,
  f. means for rotating the shaft, and
  g. means for supporting the shaft within the frame, and
a reciprocator portion comprising:
  a. a frame,
  b. a rotatable shaft within the reciprocator frame, one one of said reciprocator shaft engageable with the clutch to rotate therewith, the other end of said reciprocator shaft having an eccentric cam formed thereon,
  c. a tool holder adapted to reciprocate within the reciprocator frame, and
  d. a cam follower operatively connecting the eccentric cam to the tool holder for reciprocation of the holder upon rotation of the reciprocator shaft.

2. A universal portable tool as recited in claim 1 and further comprising:
a stand, and
means connecting the stand with the reciprocator frame for supporting the reciprocator portion.

3. A universal portable tool as recited in claim 1 and further comprising:
a stand, and
means connecting the stand with the frame of the rotary portion for supporting the rotary portion.

4. A universal portable tool as recited in claim 2 and further comprising:
bias means for returning the reciprocator portion away from the stand after the reciprocator portion has been moved toward the stand.

5. A universal portable tool as recited in claim 4 and further comprising:
a table, and
a rack and pinion member connected between the table and the stand to adjust the position of the table relative to the reciprocator portion.

6. A universal portable tool as recited in claim 4 and further comprising:
a table, and
a rack and pinion member connected between the reciprocator portion and the table to adjust the position of the table relative to the rotary portion.

7. A universal portable tool as recited in claim 2 and further comprising:
a table having a saw blade slot therethrough, and
means for adjustably mounting the table over the rotary portion and adapted to adjust the depth of cut of a saw blade attached to the clutch and extending through the table slot.

8. A universal portable tool as recited in claim 7 wherein the table has a hole adapted to receive therethrough a tool attached to the reciprocator tool holder.

* * * * *